July 17, 1962  G. K. FARMERY ET AL  3,044,569
POWER-ASSISTED STEERING MECHANISMS FOR ROAD VEHICLES
Filed May 14, 1957  2 Sheets-Sheet 1

Inventors
George K. Farmery
Leonard J. Newman
By
Attorneys

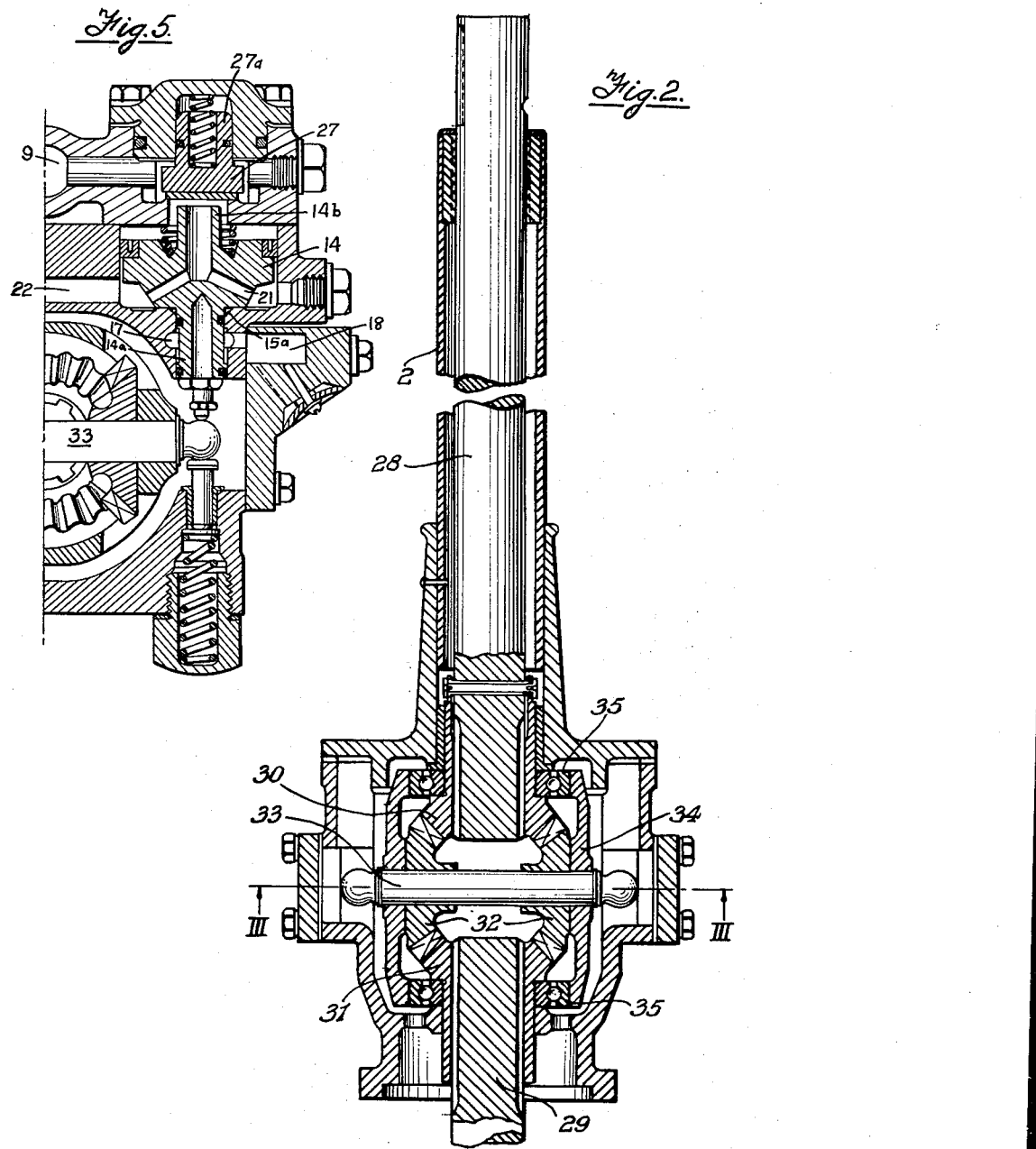

United States Patent Office 3,044,569
Patented July 17, 1962

3,044,569
POWER-ASSISTED STEERING MECHANISMS FOR ROAD VEHICLES
George K. Farmery, Scothurn, Lincoln, and Leonard John Newman, London, England, assignors to Clayton Dewandre Company Limited, Lincoln, England
Filed May 14, 1957, Ser. No. 658,998
Claims priority, application Great Britain May 16, 1956
12 Claims. (Cl. 180—79.2)

This invention relates to power-assisted steering mechanisms for road vehicles and particularly to such mechanisms of the kind wherein the steering is assisted by a double-acting fluid-pressure motor under the control of a valve mechanism which is operated by rotational movement of the steering wheel and which admits fluid pressure selectively to the two working spaces of said motor to turn the road wheels in the required direction.

The object of the invention is to provide improvements in power-assisted steering mechanisms of the above kind.

According to the invention there is provided a power-assisted steering mechanism of the above kind, wherein the control valve mechanism includes two valve members which are arranged normally to occupy neutral positions wherein they maintain the working spaces at opposite sides of the motor piston or diaphragm in communication with one another so that the motor is balanced under equal pressures, and which are operable selectively by rotational movement of the steering wheel and through a differential gear to interupt the communication between said working spaces and connect one of them with a source of fluid pressure to cause the operation of said motor in the direction corresponding to the direction of movement of the steering wheel.

In the preferred construction, the fluid pressure system is so devised that moderate servo assistance is provided by merely establishing a pressure differential within the system, that is, without exhausting any pressure fluid from the system, thereby conserving the supply of pressure fluid. Provision is made, however, by a continued movement of the actuated valve member, for exhausting the side of the motor piston opposite to that connected to the source of fluid pressure in order to obtain a greater pressure differential across the piston and thereby a greater turning force on the road wheels when required.

One embodiment of the invention will now be described by way of example and with reference to the accompanying drawings wherein:

FIG. 2 is a longitudinal section through the steering column and differential gear.

FIG. 5 is a fragmentary enlarged view of FIG. 3.

Figure 3:
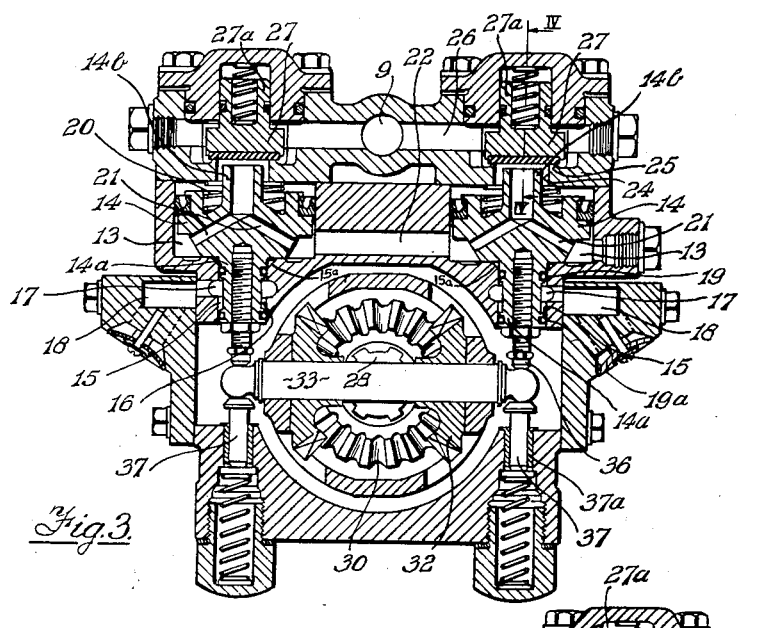
FIG. 3 is a cross section on the line III—III of FIG. 2.
Figure 4:
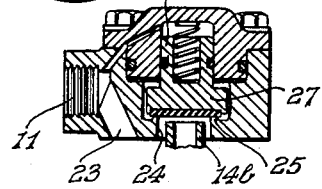
FIG. 4 is a fragmentary sectional view taken on the line IV—IV of FIG. 3.
Figure 1:
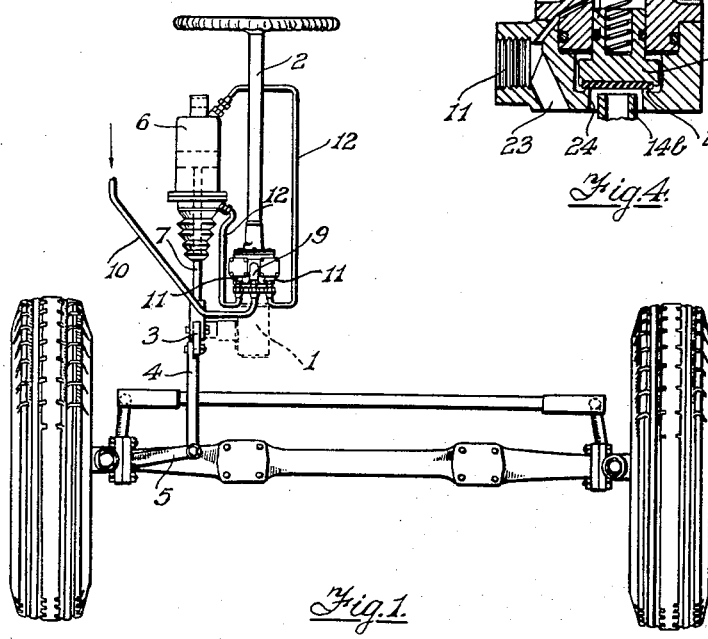
FIG. 1 is a schematic lay-out of a steering assembly incorporating the improved mechanism.

As shown in FIG. 1, the differential gear and the control valve mechanism form a unit which is mounted on the steering box 1 with the lower end of the steering column 2 fixed to the differential gear housing, the steering box embodying the usual worm gear connected by drop arm 3 and drag link 4 to a steering arm 5. The double-acting motor or power cylinder 6 is preferably connected by its piston rod 7 to the drop arm 3 although it may be connected to any other convenient point in the steering linkage. The control valve casing has an inlet port 9 connected by a pipe 10 to a source of fluid pressure, in this instance a compressed-air reservoir, and two outlet ports 11 connected respectively by pipes 12 to the opposite ends or working spaces of the motor 6.

Within the valve casing there are formed two cylindrical valve chambers 13 arranged parallel to one another and each containing a piston-headed control valve member 14. Each of these valve members has a stem 14a which is slidably guided in a bore 15 extending from the back of the respective valve chamber, i.e. behind the head of the valve member, and opening into the interior of the differential-gear casing. The two stems 14a are reduced in diameter intermediate their ends to form an annular slot 16 around each stem, and in the wall of each guide bore 15 there is formed a circumferential groove 17 which opens into the respective annular slot 16 and from which an exhaust passage 18 leads to the exterior of the valve casing. The valve members carry O-section sealing rings 19, 19a on their stems at opposite ends of the annular slots 16, and they are normally arranged to occupy neutral positoins wherein the sealing rings 19 at the inner ends of the valve stems are located just inside the ends of the guide bores and in contact with the walls thereof so as to provide airtight seals between the annular slots 16 and the valve chambers 13. Springs 20 are provided to urge the valve members towards their neutral positions. On the front of the head of each valve member 14 there is formed a tubular extension 14b whose interior communicates through branch passages 21 in the valve head with the space behind said valve head. These spaces in the valve chambers are themselves in permanent communication with one another through a passage 22 extending across the valve casing. The spaces in front of the two valve heads communicate respectively and by passages 23 with the two outlets 11 connected to the working spaces in the motor 6.

In the front of each valve chamber there is formed a circular aperture 24 which opens through an annular valve seat 25 onto a gallery 26 extending across the valve casing and communicating with the inlet connection 9. The apertures 24 are normally closed by two spring-loaded disc-shaped inlet valve members 27 which engage the annular valve seats 25 and are preferably faced with synthetic rubber or the like. These valve members are arranged co-axially with the piston-headed valve members 14 and are selectively engageable by the latters' tubular extensions 14b so as to be unseated thereby as will be described later herein. The inlet valve members 27 are formed with stems 27a which are slidably guided in the wall of the valve casing and which are of substantial diameter in relation to the diameter of said valve members. This reduces the area of each of the valve members 27 acted upon by the air pressure from the reservoir in opposition to the unseating of the inlet valve members and thus has a balancing effect which gives more sensitive control of the valve operation.

The differential gear through which the control valve mechanism is operated is interposed between the lower end of the steering column shaft 28 and the upper end of a short shaft 29 which is arranged co-axially with the steering column shaft and to which is fixed the worm gear, or its equivalent, in the steering box 1. As an alternative to employing this short shaft the steering column shaft may be divided at any point where it is desired to fit the control valve mechanism and differential gear, the latter then being interposed between the adjacent ends of the two parts of the shaft.

The differential gear includes a pair of bevel pinions 30, 31 splined or otherwise fixed on the lower end of the steering column shaft 28 and on the upper end of the short shaft 29 respectively, and a pair of planetary bevel pinions 32 meshing with the pinions 30, 31 and which are freely mounted upon a spindle 33 arranged between the pinions 30, 31 and perpendicular to the common axis thereof. The spindle 33 is mounted in a cage 34 which runs on ballbearing races 35 on the shafts 28, 29. The ends of the spindle project beyond the cage and are engaged by tappets or abutments 36 on the ends of the valve stems 14a. The spindle 33 lies transversely of the valve members 14 so that the tappets 36 are engaged by the spindle on one side thereof. The other side the ends of the spindle are engaged by two spring-loaded plungers 37 which are slidably mounted in the gear casing coaxially with the valve members 14. These plungers serve to locate and pre-load the spindle in a neutral position wherein it lies at right-angles to the axes of said valve members. With the spindle in this position both valve members 14 remain in their neutral positions wherein they are disengaged from the inlet valves 27 which consequently remain seated. The two working spaces in the motor cylinder 6 are thus cut off from the compressed-air reservoir and communicate with one another through the tubular extensions 14b on the valve members 14 and the passage 22 connecting the two valve chambers 13. The piston in the power cylinder is therefore balanced under equal pressures and remains at rest. In addition, the connections to the two exhaust passages 18 are closed and the complete system is therefore sealed off from atmosphere.

The operation of the mechanism is as follows:

Considering first the application of only a light torque or effort to the steering wheel, movement of the steering wheel will produce a corresponding rotation of the bevel pinion 30 and this in turn will impart rotation to the two planetary pinions 32. As the other bevel pinion 31 is initially held stationary by the friction of the road wheels on the ground, the planetary pinions roll around this pinion and impart an angular displacement to the spindle 33. This moves one of the valve members 14 (hereinafter termed "the operative valve member") away from its neutral position firstly to bring its tubular extension 14b into engagement with the associated inlet valve member 27 and thereby interrupt the communication between the two working spaces in the motor cylinder 6, and then to unseat this inlet valve member so as to admit compressed air from the reservoir through the front of the valve chamber 13 in which the operative valve member is mounted and through outlet 11 and the associated pipe 12 to the working space communicating with that valve chamber. A residual pressure is always maintained in the fluid pressure system, as will be more fully explained later, but as soon as the pressure of the compressed air admitted to one end of the motor cylinder exceeds the residual pressure in the other end of said cylinder, the pressure differential across the piston displaces the piston to turn the road wheels in the required direction. The pressure acting on the motor piston also reacts against the head of the operative valve member 14 and gives the driver a 'feel' of the degree of power-assistance being applied. This reaction is proportional to the pressure acting on the motor piston and as the pressure increases an increased manual effort is required at the steering wheel to balance the reaction. Thus the power output is at all times proportional to the manual input.

The movement of the road wheels is transmitted back through the steering linkage and the steering box to cause rotation of the short shaft 29 on which the lower pinion 31 of the differential gear is fixed. This rotation occurs in the reverse direction to that of the steering wheel, and if the latter is held stationary after the road wheels have been turned the required amount the pinion 31 will roll the planetary pinions 32 back to a position in which the operative valve member 14 allows the associated inlet valve member 27 to close, so cutting off further supply of compressed air, but maintains contact with said inlet valve member so that communication between the two ends of the motor cylinder remains interrupted. The motor piston comes to rest as soon as a balance of pressure is established across the piston thereby holding the road wheels on the set lock unless a further turning movement is imparted to the steering wheel. When the steering wheel is returned to straight ahead position, the rotation of bevel pinion 30 returns the operative valve member 14 to its neutral position so re-establishing communication between opposite ends of the motor cylinder. Thus the fluid pressure system offers no resistance to the return movement of the road wheels, the steering arm 3 returning the motor piston to its original position and a pressure balance being established throughout the system at a value lying between the two pressures previously existing in the two ends of the motor cylinder.

Where a much greater torque or effort is applied to the steering wheel, the operative valve member 14 will be moved beyond the position described above and to a degree such that the sealing ring 19 is withdrawn from the bore 15. To insure this, a chamfer 15a may be provided on the adjacent end of bore 15. By this movement, the end of the motor cylinder opposite to that now connected to the compressed air reservoir is connected to atmosphere through the annular slot 16 of the operative valve member, the groove 17 and exhaust passage 18 whereby a much larger pressure differential is set up across the motor piston to produce the required increased turning force on the road wheels. Here again, the follow-up action of the road wheels, acting through the differential gear, partly returns the operative valve member to its initial position, closing off the exhaust outlet, establishing a pressure balance across the motor piston and holding the road wheels on the set lock. Return of the steering wheel to straight ahead position restores the operative valve member to its neutral position as has been previously described, the two ends of the motor are again interconnected and a pressure balance is established in the motor by appropriate circulation of pressure fluid around the system. Thus irrespective of the degree of servo assistance provided, there is always a residual pressure within the system after completing a steering movement, such arrangement conserving the compressed air, which would otherwise be exhausted to atmosphere after each operation of the mechanism, and also reducing the overall consumption of air since a proportion of the air used in each operation is utilised in the following operation.

In the event of failure of the power mechanism the manual effort applied to the steering wheel is transmitted directly through the differential gear to the steering box and thence through the drop-arm and steering assembly to the road wheels. Although the initial movement of the steering wheel still imparts angular displacement to the spindle 33, such displacement is liimted by the abutment of the head of one of the preloading plungers 37 with its guide 37a, so that continued movement of the steering wheel is transmitted through the planetary pinions 32 to the pinion 31 and thus to the steering box. The differential gear reverses the movement of the steering wheel but this reversal is corrected by the employment of an appropriately threaded worm in the steering box.

In addition to providing power-assistance for the driver in steering the vehicle under both normal and adverse conditions, the air-pressure cylinder of the power motor also absorbs any shocks whihc may be produced on the road wheels when the vehicle is traversing uneven ground or in the event of a tire bursting. Thus the driver is relieved of the fatigue which he would normally suffer due to such shocks being transmitted to the steering wheel. Furthermore, the sudden deflection of the wheels caused by such shocks is immediately corrected by the power cylinder, since the movement of the wheels is automatically transmitted through the steering linkage and the differential gear to the spindle 33 whose consequent displacement causes the appropriate correcting operation of the control valve mechanism.

It will be understood that the double-acting, fluid-pressure motor may be substituted by two single-acting, spring-return motors having appropriate interconnections and the term "double-acting motor" is used herein to embrace such alternative motor means.

We claim:

1. Power-assisted steering mechanism for road vehicles having road wheels and a steering wheel connected thereto, comprising a power motor containing a chamber having a differential pressure operable member and means for connecting said motor to the road wheels of the vehicle, means defining a passage for establishing fluid pressure transmitting communication between the motor chamber ends at opposite sides of said piston, control mechanism including a pair of movable control members for said passage, a source of fluid pressure, a pair of fluid pressure inlet valve members communicating with the source of fluid pressure and cooperative with and positioned relatively to the respective control members for opening thereby to admit fluid pressure to the respective ends of the power motor cylinder in response to actuation of the respective control valve members, means actuated by predetermined valve opening movement of a control member associated with one of said inlet valves for closing said communicating passage, means actuated by further valve opening movement of said control member for connecting to exhaust the end of said chamber opposite to that being supplied with fluid under pressure through said one inlet valve, and means operable by movement of the steering wheel in one or another direction for actuating the control members.

2. In the power assisted steering mechanism defined in claim 1, means effective after the road wheels have been so turned by movement of the steering wheel and responsive to reestablishment road wheel straight ahead steering condition for reestablishing exhaust-free communication through said passage between the chamber ends.

3. Power-assisted steering mechanism as defined in claim 1, including differential gearing interposed between the steering wheel and road wheels and having a spindle carrying planetary pinions, and wherein said control members are arranged in parallelism and provided with tappets which engage one side of the ends of said spindle, and control member preloading springs having plungers which are axially aligned with said control members and engage said spindle at the opposite side to said tappets.

4. Power-assisted steering mechanism as defined in claim 1, wherein said control members are capable of said further movement in response to the application of an increased effort to the steering wheel to connect to exhaust the end of the power motor chamber opposite to that connected to the source of fluid pressure to thereby produce an increased pressure differential across the differential pressure operable member of the power motor and a greater turning force on the road wheels.

5. Power-assisted steering mechanism as defined in claim 4, wherein turning movement of the road wheels returns the actuated control member to a position in which it closes said connection to exhaust and disconnects the power motor from the source of fluid pressure while communication between opposite ends of the motor chamber remains interrupted whereby the road wheels are held on their set lock, and movement of the steering wheel to the straight ahead position returns the control members to neutral positions and restores a pressure balance within the fluid pressure system.

6. Power-assisted steering mechanism as defined in claim 1, wherein each of said control members includes a piston-like valve head and a cylindrical valve chamber in which it is slidable, said valve chambers being permanently interconnected at the rear sides of the heads and being connected at the front sides of said valve chambers respectively to opposite ends of the power motor chamber, and said control members each having passage means therein extending from the front to the rear side thereof which is closed by contact of said control member with the respective inlet valve member.

7. Power-assisted steering mechanism for road vehicles having road wheels and a steering wheel connected thereto, comprising a power motor containing a chamber having a differential pressure operable member and means for connecting it to the road wheels of the vehicle, means defining a passage for establishing fluid pressure transmitting communication between the motor chamber ends at opposite sides of said differential pressure operable member, control mechanism including a pair of movable control members for said passage, a source of fluid pressure, a pair of fluid pressure inlet valve members communicating with the source of fluid pressure and cooperative with and positioned relatively to the respective control members for opening thereby to admit fluid pressure to the respective ends of the power motor cylinder in response to actuation of the respective control valve members, means actuated by valve opening movement of a control member for closing said passage, and means operable by movement of the steering wheel in one or another direction for actuating the control valve members, each of said control members including a piston-like head and a cylindrical chamber in which it is slidable, said chambers being permanently interconnected at the rear sides of the heads and being connected at the front sides of said heads respectively to opposite ends of the power motor chamber, said control members each having passage means therein extending from the front to the rear side thereof which is closed by contact of the control member with the respective inlet valve member, and each of said control members including a valve stem formed with a circumferential slot slidable in a bore provided with a port leading to an exhaust, said slot, in response to additional movement of an actuated control member, connecting the valve chamber at the rear side of the control member head to exhaust.

8. Power-assisted steering mechanism as defined in claim 7, wherein a port is provided for admission of fluid pressure to each of said control chambers at the front side of said head, and including a disc valve for controlling said port, said head having a tubular extension providing said passage means and which, upon actuation of the respective control member, engages said disc valve to close said passage means and by further movement of the control member unseats said disc valve.

9. Power assisted steering mechanism for a vehicle having dirigible road wheels comprising a power motor having a chamber containing a pressure responsive element operably connected to said wheels, means providing a source of fluid pressure, means comprising passage means and two selectively operable valves for admitting fluid pressure to one side or another of said element, means providing an exhaust passage to atmosphere, means operable to open one of said valves to admit fluid pressure to one side of said element to actuate the motor to turn said wheels, means operable only in response to predetermined resistance to turning of said road wheels for sequentially connecting the other side of said element to said exhaust, and means operable when the road wheels reassume straight ahead condition for closing connection of said other side of the element to exhaust.

10. In a power assisted steering mechanism for a vehicle having dirigible road wheels, a power motor having a chamber containing a pressure responsive element connected to said wheels, a source of fluid pressure, passage means between said source and opposite sides of said element and a pair of inlet valves in said passage means for controlling application of pressure to opposite sides of said element, a pair of selectively operable valve control members one for each inlet valve, steering means connected to move one or the other of said control members, atmospheric exhaust passage means adjacent each control member, and means operable when one of said control members opens its associated inlet valve to admit fluid under pressure to one side of said element and only upon encountering predetermined resistance to turning of said road wheels for sequentially connecting said exhaust passage means to the other side of said element.

11. In the power assisted steering mechanism defined in claim 10, said control members having passages therethrough permanently connected at adjacent inner ends and adapted to be connected at their outer ends to the motor chamber at the respective sides of said element, and means effective when one control member opens its associated inlet valve for blocking said passage through said one control member from communication with the motor chamber and for sequentially connecting said exhaust passage through said one control member to the side of the motor element opposite to that to which fluid pressure is applied.

12. Power assisted steering mechanism for a road vehicle having dirigible wheels comprising a power motor having a differential pressure responsive element operably connected to said wheels, means providing a source of fluid pressure, control mechanism for said motor comprising coacting valve and passage means normally adapted to establish fluid communication between opposite sides of said element, means for actuating said valve means for sequentially closing fluid communication between said opposite sides of said element and connecting said source of fluid pressure to one side of said element, and means operated by said valve actuating means after said one side of the element is so connected to said source of fluid pressure for connecting the other side of said element to exhaust to atmosphere.

References Cited in the file of this patent

UNITED STATES PATENTS

| | | |
|---|---|---|
| 2,417,963 | Barnhart | Mar. 28, 1947 |
| 2,567,073 | Kupiec | Sept. 4, 1951 |
| 2,569,881 | Davies | Oct. 2, 1951 |
| 2,583,185 | McLeod | Jan. 22, 1952 |

FOREIGN PATENTS

| | | |
|---|---|---|
| 759,163 | Great Britain | Oct. 17, 1956 |

OTHER REFERENCES

Automotive Industries, Feb. 1, 1953, pp. 71 and 114.
Autocar, Feb. 19, 1954, pp. 241 and 242.